Nov. 11, 1969  I. RESNICK  3,477,967
SYNTACTIC FOAM
Filed March 28, 1966  2 Sheets-Sheet 1

INVENTOR.
ISRAEL RESNICK
BY
AGENT
ATTORNEY

Nov. 11, 1969     I. RESNICK     3,477,967

SYNTACTIC FOAM

Filed March 28, 1966     2 Sheets-Sheet 2

INVENTOR.
ISRAEL RESNICK

BY *Arthur L. Bowers*
AGENT

ATTORNEY

United States Patent Office 3,477,967
Patented Nov. 11, 1969

3,477,967
SYNTACTIC FOAM
Israel Resnick, Bellerose, N.Y., assignor to the United States of America as represented by the Secretary of the Navy
Filed Mar. 28, 1966, Ser. No. 538,920
Int. Cl. C08f 47/08; C08g 53/08
U.S. Cl. 260—2.5   3 Claims

ABSTRACT OF THE DISCLOSURE

A buoyancy material for extreme undersea depths wherein a volume of contiguous granular glass filler is embedded in an otherwise unfilled essentialy void-free cured epoxy matrix of maximum compressive strength, of minimum viscosity in the uncured state, that does not volatilize during curing, and which is of minimum density.

Figure 1:
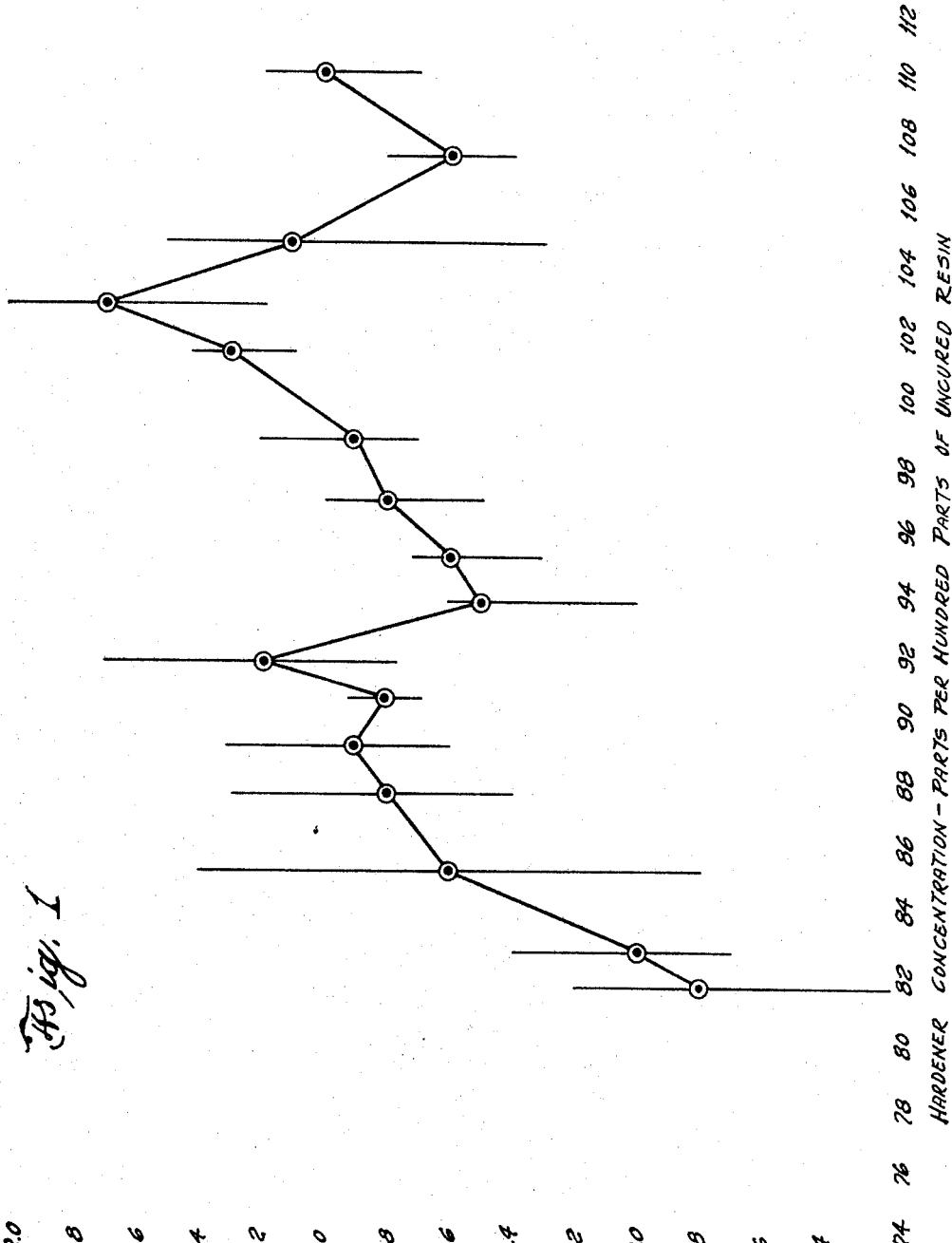

The invention described herein may be manufactured and used by or for the Government of the United States of America for governmental purposes without the payment of any royalties thereon or therefor.

---

This invention relates to buoyancy materials for general applications but more particularly for deep sea applications.

Better buoyancy materials are needed for incorporating in payload transporting deep submergence buoyant vehicles and are also needed for supporting tethered ocean platforms, acoustic arrays, and underwater equipments above the bottom. For some applications, it would be advantageous for the buoyancy material to be a sound attenuator. An ideal deep submergence buoyancy material would have substantial net buoyancy in terms of its weight and volume, minimum cost per pound of net buoyancy, such high compressive strength as to suffer no damage even in the deepest places in the oceans, zero water absorption, shall suffer no deterioration in compressive strength nor absorb water whether subjected to continuous high pressure or cyclic changes in pressure ranging between atmospheric and that at the ocean floor, essentially zero temperature coefficient of expansion contraction, adequate impact strength, and bulk modulus of compressibility equal to or higher than that of water. The later is defined as the ratio of pressure to compressibility; compressibility is the change in volume (over the pressure range), divided by the volume.

Attention was focused on buoyancy material for deep submergence vehicles when the bathyscaphe *Trieste* made its now historic drive. The *Trieste* can be compared to a blimp in the sense that both have a pod appended to a comparatively large buoyant tank. The buoyancy tank of the *Trieste* was designed to contain gasoline for want of a better buoyancy material despite serious disadvantages including fire hazard, substantial compressibility affecting buoyancy and trim stability, significant contraction with drop in temperature, and the danger accompanying the use of any fluid for buoyancy, namely, escape of the fluid through any fault in the wall of the buoyancy tank. Furthermore, buoyancy tanks suitable for the pressure range are very expensive.

Metallic lithium with a density of 33 lbs. per cubic foot is one of the least dense solids available. It has been considered for use as a deep sea submergence buoyancy material. Because lithium and water react vigorously when brought together, liberating hydrogen gas, this material has been deemed too hazardous for personnel carrying vehicles. Suitable corrosion resistant metallic containers for lithium significantly reduce the net buoyancy of the combination. Also, the cost of lithium plus the suitable container is too high.

Other materials which have been considered include wood, organic polymers including polyethylene and polypropylene, foamed plastics, and metal or ceramic foams. Wood as a buoyancy material is limited to surface or near surface applications because of low strength and high water absorption. Foams, both plastic and inorganic, have excessive permeability and inadequate strength for deep submergence. Low density plastics have limited buoyancy as a class. At moderate depth, plastics in the form of thick-walled hollow spheres are useful but for deep submergence applications, they are unsuitable.

An object of this invention is to provide a buoyancy material as near ideal as possible for deep submergence applications.

A further object is to provide a buoyancy material suitable for long term use under hydrostatic pressure greater than 10,000 pounds per square inch.

A further object is to provide a reliable buoyancy material for long term use in a deep submergence vehicle that may range between the surface and thousands of feet in depth and that can also provide structural support to the hull of the vehicle.

A further object is to provide superior deep-depth buoys for reliable long-term use as cable, platform, acoustic-array or equipment supports.

A further object is to provide a superior buoyant material for long term use under water at great depth and which has sound attenuation characteristics as well as superior buoyancy characteristics.

A further object is to provide a buoyant material suitable for potting the insides of unmanned oceanographic probes.

Other objects and advantages will appear from the following description of an example of the invention, and the novel features will be particularly pointed out in the appended claims.

Figure 2:
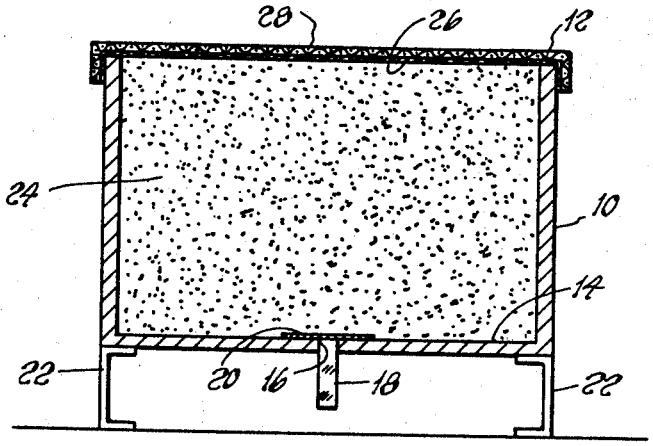
Figure 3:
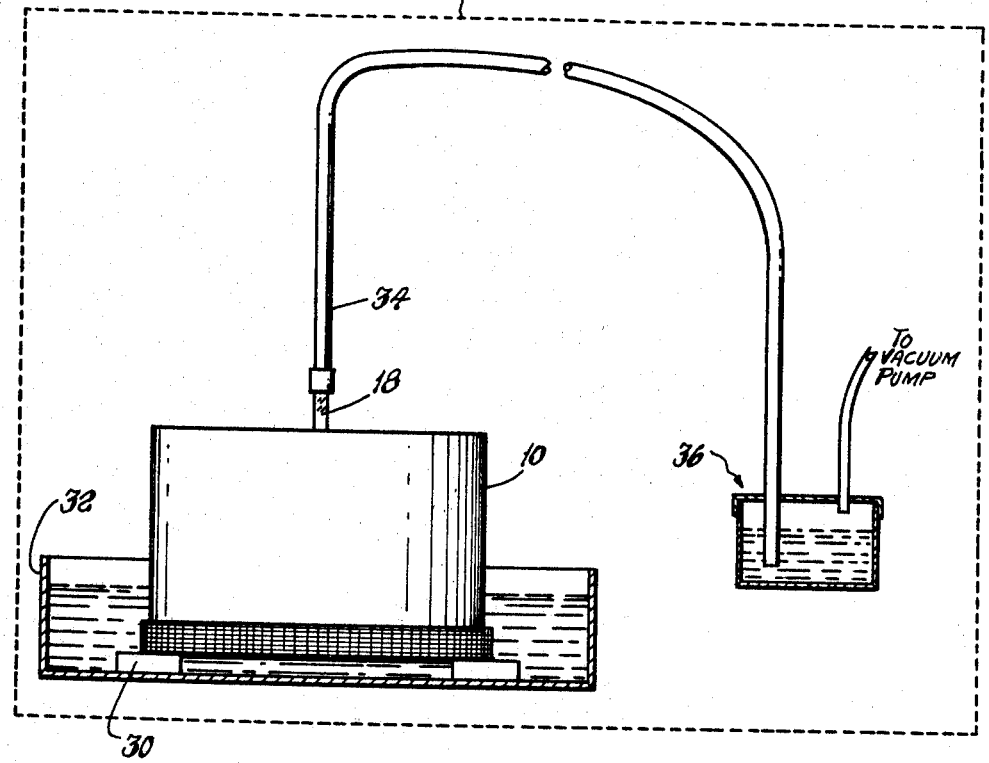

FIG. 1 illustrates graphically the relationship between compressive strength of a particular cured resin and the parts of hardener per 100 parts of uncured resin, and FIGS. 2 and 3 illustrate a preferred technique of forming a block of syntactic foam of a selected geometry.

I have discovered that a specific syntactic foam fabricated by a particular technique is exceptionally suited to deep sea submergence applications. Syntactic foam is a material consisting of a resinous plastic matrix containing low density hollow granular filler. In this invention the filler consists of high strength, approximately spherical, microscopic hollow glass grains, average particle density not over .45, wall thickness approximately 1.8 microns, 20–90 microns outside diameter, a product which has been marketed commercially. The filler is embedded in a particular epoxy resin matrix. A composition for the resin component of the syntactic foam that I discovered to have the best properties is as follows:

(a) The reaction product of epichlorohydrin with bis (4-hydroxyphenyl) dimethyl methane which is an epoxy resin—100 parts by weight. The resin shall have an epoxide equivalent in the range 175–210 and shall have a viscosity as low as is available but no higher than 5000 centipoises at 25° C. As a practical matter the lowest viscosity of available commercial materials is somewhat less than 5000 centipoises at 25° C.

(b) A hardener consisting of methylbicyclo[2,2,1] heptene 2,3-dicarboxylic anhydride isomers—100–104 parts by weight.

(c) An accelerator consisting of benzyldimethylamine (3)—1 part by weight.

Other hardeners were not satisfactory either because a syntactic foam of lower strength resulted or because of difficulties in handling; many of the acid type hardeners are solid at room temperature and require preheating for use.

The resin cured according to the temperature schedule described below, and without filler, has a uniaxial compressive strength of approximately 21,600 pounds per square inch, which is higher than that of any other resin that might be used in syntactic foam for deep submergence applications. The range of hardener concentration is due to variations among commercially purchased hardeners. Actually the composition described is the optimum composition. The same materials in a composition wherein the hardener concentration per hundred parts of resin by weight is anywhere between 83–110 parts by weight, results in a cured resin which has a compressive strength higher than that of any other resin that might be used in syntactic foam for deep submergence applications. FIG. 1 shows the relationship between concentration of hardener and uniaxial compressive strength.

The quantity of the above-recited accelerator may range from 0.2 to 1.0 part by weight. Other accelerators may be used, e.g. trimethyl amino methyl phenol 0.5 to 3.0 parts by weight, or dimethyl amino methyl phenol 0.5 to 3.0 parts by weight, or alpha-methylbenzyl dimethyl amine 1 to 3 parts by weight. The choice of accelerator and the quantity affects the temperature and time of cure, as is well known to those skilled in the art. The cure time and temperature for the resin system described varies with specimen or casting size and geometry. The following cure schedule is preferred for a small specimen:

(a) 2 hours at 100 degrees C.
(b) Then 2 hours at 121 degrees C.
(c) Then postcured 16 hours at 177 degrees C.

Since the curing of the resin system is exothermic, larger specimens require a slower, more gradual cure schedule.

The other component of the syntactic foam is the microscopic hollow glass spheres. The syntactic foam has superior properties for deep submergence applications if the percentage of glass filler by weight is within the range of 30 to 50 percent. The properties of the syntactic foam varies with percentage of glass filler as follows. The density of the foam is lower with a higher percentage of filler. However, compressive strength, compressive modulus decrease while percentage water absorption increases with increased percentage of filler.

The water absorptiveness of the syntactic foam is reduced and the compressive strength increased by the addition of less than one part by weight of one of the following coupling agents to the resin system.

(a) Gamma-aminopropyltriethoxysilane
(b) 3,4-epoxycyclohexylethyltrimethoxysilane In the composition described the resin is somewhat stronger than the glass. The strength of commercially marketed glass filler has been improved and it is foreseeable that a glass filler of the type described stronger than the resin described will become available.

In FIG. 2 there is shown a method of making the syntactic foam described with optimum properties. A container 10 to serve as a mold has an open end 12 and an opposite closed end 14 with an opening 16. A transparent pipe stub 18 is sealed in the opening 16. The inner surface of the container in the direction between the bottom 14 and the open end, all around the container, is continuous or straight and preferably formed with enough draft to permit easy withdrawal of a casting formed in the container. The opening 16 is overlaid with a swatch of fiber glass cloth 20 attached to the surface around opening 16. The inside surface of the container is waxed to render it relatively non-adherent. The container is supported level on any convenient means 22 that provides clearance for pipe stub 18, and completely filled with the hollow spherical granular glass filler 24. The container is vibrated, shaken, or tapped gently to compact the filler in the container and more of the filler is added till level full. Then fiber glass cloth 26 is stretched across the open end 12 and cemented to the exterior surface. A stiff metal screen 28 is laid over the fiber glass cloth 26 and bent over the edge of the open end of the container.

The container is turned over and seated on spacer elements 30 in the bottom of a comparatively large waxed pan 32 thereby permitting fluid in the pan to flow into the open end of the container. A hose 34 is coupled to the transparent pipe stub 18 and to a vacuum pump, not shown, through a conventional trap 36. The apparatus assembled as in FIG. 3 is located in a temperature controlled chamber wherein the temperature is continuously adjustable up to about 300° F. A supply of the resin system mix is poured into the pan 32. The vacuum pump is set in operation. It is advantageous to choose from among available resins that meet the previously recited specifications that resin having the lowest viscosity to facilitate the operation illustrated in FIG. 3. If the viscosity of the fluid appears to be too high the temperature of the chamber is elevated. Gelation is not hastened if the temperature remains well below 200° F. The fluid rises into the container and after filling the container rises into the transparent pipe stub or in the alternative, into a transparent sight tube, not shown, just past the pipe stub which, in the latter case, is not transparent. When this occurs the vacuum pump is adjusted to reduce the pressure differential thereacross whereby the fluid level terminates in the glass stub. The pump is continued at that setting. Entrapped gas continues to escape thereafter. When the resin is polymerized, the pump is shut down and the hose 34 disconnected. Some of the cured resin around the exterior of the container is chipped away. Then the casting in the container is readily removable. Since the hollow glass spheres are buoyant in the resin system mix, a thin layer of the casting that was nearest the open end of the container may be comparatively free of the glass if there was any clearance in the container for the glass to rise upwardly. That layer is cut away on a band saw.

The described method of making a cast block of the syntactic foam results in a maximum ratio of glass to foam, namely, about 65 percent glass filler by volume and 35% resin system mix or about 40 percent glass filler by weight. Also, there is minimum breakage of glass spheres in the course of handling and forming the block, no dry or weaker areas, and minimum entrapped gas. It is not necessary to measure the filler; the quantity of filler used is the amount that fills the container compactly. If the filler and resin system mix are combined in a container and mixed with a stirring paddle and then cured, a product that is superior to other buoyancy means known in the art can be obtained but not as good and of as consistent quality as that obtained by the method described. Stirring results in some breakage of the hollow glass spheres. If the mixture is not stirred the concentration of filler near the bottom of the mixture is very low. Some pockets of gas are entrapped, the filler is more dispersed and it is more difficult to obtain the optimum mixture.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A syntactic foam consisting of hollow granular glass filler embedded in a cured resin that is essentially void-free around and between the surface areas of the glass filler granules, the resin being obtained from the resin system consisting of 100 parts by weight of uncured resin, said resin being the reaction product of epichlorohydrin with bis (4-hydroxyphenyl) dimethyl methane, 100–104 parts by weight hardener, said hardener being methylbicyclo[2,2,1]heptene 2,3-dicarboxylic anhydride isomers, and 1 part by weight of accelerator, said accelerator being benzyldimethylamine [3].

2. A syntactic foam as defined in claim 1, wherein said hollow granular glass is 20–90 microns diameter, and said filler is about 65% by volume of the syntactic foam.

3. A syntactic foam consisting of hollow granular glass filler embedded in a cured resin that is essentially void-free around and between the glass filler surface areas, the resin being obtained from the resin system comsisting of
    100 parts by weight of uncured resin, said resin being the reaction product of epichlorohydrin with bis (4-hydroxyphenyl) dimethyl methane,
    100–104 parts by weight hardener, said hardener being methylbicyclo[2,2,1]heptene 2,3-dicarboxylic anhydride isomers, and an accelerator selected from the group consisting of
    0.2 to 1.0 part by weight benzyldimethylamine (3),
    0.5 to 3.0 parts by weight trimethyl amino methyl phenol,
    0.5 to 3.0 parts by weight dimethyl amino methyl phenol, and
    1 to 3 parts by weight alpha-methylbenzyl dimethyl amine.

References Cited
UNITED STATES PATENTS

| | | |
|---|---|---|
| 2,806,509 | 9/1957 | Bozzocco et al. |
| 2,967,843 | 1/1961 | Delmonte et al. |

MURRAY TILLMAN, Primary Examiner

W. J. BRIGGS, Sr., Assistant Examiner

U.S. Cl. X.R.

9—8; 260—37, 47